US010855037B2

(12) United States Patent
Lammers et al.

(10) Patent No.: US 10,855,037 B2
(45) Date of Patent: Dec. 1, 2020

(54) SUPPORT ASSEMBLY WITH A SUPPORT MEMBER AND A TRACK ASSEMBLY

(71) Applicant: Lear Corporation, Southfield, MI (US)

(72) Inventors: Dale Lammers, Plymouth, MI (US); Jeffrey A. Jones, Ann Arbor, MI (US); Antoine Moulin, Aurec-sur-Loire (FR)

(73) Assignee: Lear Corporation, Southfield, MI (US)

( * ) Notice: Subject to any disclaimer, the term of this patent is extended or adjusted under 35 U.S.C. 154(b) by 0 days.

(21) Appl. No.: 16/221,949

(22) Filed: Dec. 17, 2018

(65) Prior Publication Data

US 2020/0194948 A1 Jun. 18, 2020

(51) Int. Cl.
| | |
|---|---|
| *H01R 25/16* | (2006.01) |
| *B60N 2/07* | (2006.01) |
| *B60N 2/015* | (2006.01) |
| *H01R 13/424* | (2006.01) |
| *H01R 13/11* | (2006.01) |
| *B60N 2/02* | (2006.01) |

(52) U.S. Cl.
CPC ........... *H01R 25/162* (2013.01); *B60N 2/015* (2013.01); *B60N 2/0715* (2013.01); *H01R 13/113* (2013.01); *H01R 13/424* (2013.01); *H01R 25/165* (2013.01); *B60N 2002/0264* (2013.01)

(58) Field of Classification Search
CPC .. H01R 25/162; H01R 13/424; H01R 25/165; H01R 13/113; H01R 25/14; H01R 25/142; H01R 25/16; H01R 25/161; H01R 35/04; H01R 9/26; H01R 4/64; H01R 9/2608; B60N 2/015; B60N 2/0715; B60N 2002/0264

USPC ........... 439/210, 110–120, 839, 13, 532, 116
See application file for complete search history.

(56) References Cited

U.S. PATENT DOCUMENTS

| 2,126,143 A | 8/1938 | McGregor |
| 2,263,554 A | 11/1941 | Brach |

(Continued)

FOREIGN PATENT DOCUMENTS

| CN | 203190203 U | 9/2013 |
| CN | 203799201 U | 8/2014 |

(Continued)

OTHER PUBLICATIONS

Co-pending U.S. Appl. No. 16/597,187, filed Oct. 9, 2019.
Co-pending U.S. Appl. No. 16/672,989, filed Nov. 4, 2019.
Co-pending U.S. Appl. No. 16/711,661, filed Dec. 12, 2019.

*Primary Examiner* — Travis S Chambers
(74) *Attorney, Agent, or Firm* — Fishman Stewart PLLC

(57) ABSTRACT

A support assembly includes a support member and a track assembly. The support member may include a conductor and/or a pin. The track assembly may include a bus bar. The conductor may be configured to rotate with and/or about the pin to selectively engage the bus bar. The conductor may be configured to rotate about a vertical axis to selectively engage the bus bar. The conductor may be substantially curved and/or substantially planar. The conductor may include a first position and/or a second position. The conductor may not be in electrical contact with the bus bar when in the first position and/or the conductor may be in electrical contact with the bus bar when in the second position. When the conductor is in the first position, the conductor may not restrict removal of the support member from the track assembly.

20 Claims, 9 Drawing Sheets

(56) References Cited

U.S. PATENT DOCUMENTS

| | | | |
|---|---|---|---|
| 2,480,622 A | 8/1949 | Warnock | |
| 2,678,082 A | 5/1954 | Nathan | |
| 3,181,102 A * | 4/1965 | Fehr, Jr. | H01R 25/14 439/116 |
| 3,213,403 A * | 10/1965 | Hermann | H02G 5/08 439/114 |
| 3,268,848 A * | 8/1966 | Adams | H02B 1/36 439/114 |
| 3,836,936 A * | 9/1974 | Clement | H01R 25/14 439/115 |
| 3,940,182 A | 2/1976 | Tamura | |
| 4,020,769 A | 5/1977 | Keir | |
| 4,198,025 A | 4/1980 | Lowe et al. | |
| 4,243,248 A | 1/1981 | Scholz et al. | |
| 4,282,631 A | 8/1981 | Uehara et al. | |
| 4,511,187 A | 4/1985 | Rees | |
| 4,575,295 A | 3/1986 | Rebentisch | |
| 4,618,808 A | 10/1986 | Ish-Shalom et al. | |
| 4,707,030 A | 11/1987 | Harding | |
| 4,711,589 A | 12/1987 | Goodbred | |
| 4,763,360 A | 8/1988 | Daniels et al. | |
| 4,776,809 A | 10/1988 | Hall | |
| 4,830,531 A | 5/1989 | Condit et al. | |
| 4,961,559 A | 10/1990 | Raymor | |
| 4,969,621 A | 11/1990 | Munchow et al. | |
| 4,987,316 A | 1/1991 | White et al. | |
| 5,137,331 A | 8/1992 | Colozza | |
| 5,167,393 A | 12/1992 | Hayakawa et al. | |
| 5,192,045 A | 3/1993 | Yamada et al. | |
| 5,222,814 A | 6/1993 | Boelryk | |
| 5,322,982 A | 6/1994 | Leger et al. | |
| 5,332,290 A | 7/1994 | Borlinghaus et al. | |
| 5,348,373 A | 9/1994 | Stiennon | |
| 5,446,442 A | 8/1995 | Swart et al. | |
| 5,466,892 A | 11/1995 | Howard et al. | |
| 5,489,173 A | 2/1996 | Hofle | |
| 5,582,381 A | 12/1996 | Graf et al. | |
| 5,599,086 A | 2/1997 | Dutta | |
| 5,618,192 A * | 4/1997 | Drury | H01R 25/14 439/110 |
| 5,655,816 A | 8/1997 | Magnuson et al. | |
| 5,676,341 A | 10/1997 | Tarusawa et al. | |
| 5,696,409 A | 12/1997 | Handman et al. | |
| 5,701,037 A | 12/1997 | Weber et al. | |
| 5,796,177 A | 8/1998 | Werbelow et al. | |
| 5,800,015 A | 9/1998 | Tsuchiya et al. | |
| 5,899,532 A | 5/1999 | Paisley et al. | |
| 5,918,847 A | 7/1999 | Couasnon | |
| 5,921,606 A | 7/1999 | Moradell et al. | |
| 5,964,442 A | 10/1999 | Wingblad et al. | |
| 5,964,815 A | 10/1999 | Wallace et al. | |
| 6,036,157 A | 3/2000 | Baroin et al. | |
| 6,142,718 A | 11/2000 | Kroll | |
| 6,150,774 A | 11/2000 | Mueller et al. | |
| 6,166,451 A | 12/2000 | Pigott | |
| 6,216,995 B1 | 4/2001 | Koester | |
| 6,227,595 B1 | 5/2001 | Hamelin et al. | |
| 6,299,230 B1 | 10/2001 | Oettl | |
| 6,318,802 B1 | 11/2001 | Sjostrom et al. | |
| 6,357,814 B1 | 3/2002 | Boisset et al. | |
| 6,400,259 B1 | 6/2002 | Bourcart et al. | |
| 6,405,988 B1 | 6/2002 | Taylor et al. | |
| 6,422,596 B1 | 7/2002 | Fendt et al. | |
| 6,439,531 B1 | 8/2002 | Severini et al. | |
| 6,480,144 B1 | 11/2002 | Miller et al. | |
| 6,693,368 B2 | 2/2004 | Schumann et al. | |
| 6,710,470 B2 | 3/2004 | Bauer et al. | |
| 6,719,350 B2 | 4/2004 | Duchateau et al. | |
| 6,736,458 B2 | 5/2004 | Chabanne et al. | |
| 6,772,056 B2 | 8/2004 | Mattes et al. | |
| 6,805,375 B2 | 10/2004 | Enders et al. | |
| 6,851,708 B2 | 2/2005 | Kazmierczak | |
| 6,882,162 B2 | 4/2005 | Schirmer et al. | |
| 6,960,993 B2 | 11/2005 | Mattes et al. | |
| 7,042,342 B2 | 5/2006 | Luo et al. | |
| 7,113,541 B1 | 9/2006 | Lys et al. | |
| 7,159,899 B2 | 1/2007 | Nitschke et al. | |
| 7,170,192 B2 | 1/2007 | Kazmierczak | |
| 7,207,541 B2 | 4/2007 | Frohnhaus et al. | |
| 7,271,501 B2 | 9/2007 | Dukart et al. | |
| 7,293,831 B2 | 11/2007 | Greene | |
| 7,300,091 B2 | 11/2007 | Nihonmatsu et al. | |
| 7,322,605 B2 | 1/2008 | Ventura et al. | |
| 7,348,687 B2 | 3/2008 | Aichriedler et al. | |
| 7,363,194 B2 | 4/2008 | Schlick et al. | |
| 7,388,466 B2 | 6/2008 | Ghabra et al. | |
| 7,416,042 B2 | 8/2008 | Czaykowska et al. | |
| 7,434,883 B2 | 10/2008 | Deptolla | |
| 7,454,170 B2 | 11/2008 | Goossens et al. | |
| 7,455,535 B2 * | 11/2008 | Insalaco | H01R 25/14 439/110 |
| 7,505,754 B2 | 3/2009 | Kazmierczak et al. | |
| 7,523,913 B2 | 4/2009 | Mizuno et al. | |
| 7,556,233 B2 | 7/2009 | Gryp et al. | |
| 7,560,927 B2 | 7/2009 | Jacas-Miret et al. | |
| 7,633,301 B2 | 12/2009 | Steenwyk et al. | |
| 7,661,637 B2 | 2/2010 | Mejuhas et al. | |
| 7,665,939 B1 | 2/2010 | Cardona | |
| 7,739,820 B2 | 6/2010 | Frank | |
| 7,744,386 B1 * | 6/2010 | Speidel | H01R 25/145 439/118 |
| 7,980,525 B2 | 7/2011 | Kostin | |
| 7,980,798 B1 | 7/2011 | Kuehn et al. | |
| 8,010,255 B2 | 8/2011 | Darraba | |
| 8,146,991 B2 | 4/2012 | Stanz et al. | |
| 8,278,840 B2 | 10/2012 | Logiudice et al. | |
| 8,282,326 B2 | 10/2012 | Krostue et al. | |
| 8,376,675 B2 | 2/2013 | Schulze et al. | |
| 8,463,501 B2 | 6/2013 | Jousse | |
| 8,536,928 B1 | 9/2013 | Gagne et al. | |
| 8,648,613 B2 | 2/2014 | Ewerhart et al. | |
| 8,702,170 B2 | 4/2014 | Abraham et al. | |
| 8,757,720 B2 | 6/2014 | Hurst, III et al. | |
| 8,800,949 B2 | 8/2014 | Schebaum et al. | |
| 8,857,778 B2 | 10/2014 | Nonomiya | |
| 8,936,526 B2 | 1/2015 | Boutouil et al. | |
| 8,967,719 B2 | 3/2015 | Ngiau et al. | |
| RE45,456 E * | 4/2015 | Sinclair | H01R 25/142 439/111 |
| 9,010,712 B2 | 4/2015 | Gray et al. | |
| 9,018,869 B2 | 4/2015 | Yuasa et al. | |
| 9,045,061 B2 | 6/2015 | Kostin et al. | |
| 9,162,590 B2 | 10/2015 | Nagura et al. | |
| 9,174,604 B2 | 11/2015 | Wellhoefer et al. | |
| 9,242,580 B2 | 1/2016 | Schebaum et al. | |
| 9,318,922 B2 | 4/2016 | Hall et al. | |
| 9,340,125 B2 | 5/2016 | Stutika et al. | |
| 9,346,428 B2 | 5/2016 | Bortolin | |
| 9,422,058 B2 | 8/2016 | Fischer et al. | |
| 9,561,770 B2 | 2/2017 | Sievers et al. | |
| 9,610,862 B2 | 4/2017 | Bonk et al. | |
| 9,663,232 B1 | 5/2017 | Porter et al. | |
| 9,673,583 B2 | 6/2017 | Hudson et al. | |
| 9,701,217 B2 | 7/2017 | Eckenroth et al. | |
| 9,731,628 B1 | 8/2017 | Rao et al. | |
| 9,758,061 B2 | 9/2017 | Pluta et al. | |
| 9,789,834 B2 | 10/2017 | Rapp et al. | |
| 9,796,304 B2 | 10/2017 | Salter et al. | |
| 9,815,425 B2 | 11/2017 | Rao et al. | |
| 9,821,681 B2 | 11/2017 | Rao et al. | |
| 9,840,220 B2 | 12/2017 | Van Buskirk et al. | |
| 9,919,624 B2 | 3/2018 | Cziomer et al. | |
| 9,950,682 B1 | 4/2018 | Gramenos et al. | |
| 10,059,232 B2 | 8/2018 | Frye et al. | |
| 10,160,351 B2 | 12/2018 | Sugimoto et al. | |
| 10,479,227 B2 | 11/2019 | Nolte et al. | |
| 10,493,243 B1 | 12/2019 | Braham | |
| 10,549,659 B2 | 2/2020 | Sullivan et al. | |
| 10,654,378 B2 | 5/2020 | Pons | |
| 2005/0046367 A1 | 3/2005 | Wevers et al. | |
| 2005/0089367 A1 | 4/2005 | Sempliner | |
| 2005/0150705 A1 | 7/2005 | Vincent et al. | |
| 2005/0211835 A1 | 9/2005 | Henley et al. | |

(56) References Cited

U.S. PATENT DOCUMENTS

| | | |
|---|---|---|
| 2005/0215095 A1 | 9/2005 | Mitchell et al. |
| 2005/0230543 A1 | 10/2005 | Laib et al. |
| 2005/0258676 A1 | 11/2005 | Mitchell et al. |
| 2006/0131470 A1 | 6/2006 | Yamada et al. |
| 2006/0208549 A1 | 9/2006 | Hancock et al. |
| 2006/0220411 A1 | 10/2006 | Pathak et al. |
| 2008/0021602 A1 | 1/2008 | Kingham et al. |
| 2008/0084085 A1 | 4/2008 | Mizuno et al. |
| 2008/0090432 A1* | 4/2008 | Patterson ............... H01R 35/04 439/121 |
| 2009/0129105 A1 | 5/2009 | Kusu et al. |
| 2009/0251920 A1 | 10/2009 | Kino et al. |
| 2009/0302665 A1 | 12/2009 | Dowty |
| 2009/0319212 A1 | 12/2009 | Cech et al. |
| 2010/0117275 A1 | 5/2010 | Nakamura |
| 2011/0024595 A1 | 2/2011 | Oi et al. |
| 2012/0112032 A1 | 5/2012 | Kohen |
| 2013/0020459 A1 | 1/2013 | Moriyama et al. |
| 2013/0035994 A1 | 2/2013 | Pattan et al. |
| 2014/0263920 A1 | 9/2014 | Anticuar et al. |
| 2014/0265479 A1 | 9/2014 | Bennett |
| 2015/0048206 A1 | 2/2015 | Deloubes |
| 2015/0069807 A1 | 3/2015 | Kienke |
| 2015/0083882 A1 | 3/2015 | Stutika et al. |
| 2015/0191106 A1 | 7/2015 | Inoue et al. |
| 2015/0236462 A1* | 8/2015 | Davidson, Jr. ....... H01R 25/142 439/122 |
| 2016/0039314 A1 | 2/2016 | Anticuar et al. |
| 2016/0154170 A1 | 6/2016 | Thompson et al. |
| 2016/0236613 A1 | 8/2016 | Trier |
| 2017/0080825 A1 | 3/2017 | Bonk et al. |
| 2017/0080826 A1 | 3/2017 | Bonk et al. |
| 2017/0166093 A1 | 6/2017 | Cziomer et al. |
| 2017/0261343 A1 | 9/2017 | Lanter et al. |
| 2017/0291507 A1 | 10/2017 | Hattori et al. |
| 2018/0017189 A1 | 1/2018 | Wegner |
| 2018/0039917 A1 | 2/2018 | Buttolo et al. |
| 2018/0086232 A1 | 3/2018 | Kume |
| 2018/0105072 A1 | 4/2018 | Pons |
| 2018/0148011 A1 | 5/2018 | Zaugg et al. |
| 2018/0183623 A1 | 6/2018 | Schoenfeld et al. |
| 2018/0275648 A1 | 9/2018 | Ramalingam |
| 2019/0001846 A1 | 1/2019 | Jackson et al. |
| 2019/0084453 A1 | 3/2019 | Petit et al. |
| 2019/0126786 A1 | 5/2019 | Dry et al. |
| 2019/0337413 A1 | 11/2019 | Romer |
| 2019/0337414 A1 | 11/2019 | Condamin et al. |
| 2019/0337415 A1 | 11/2019 | Condamin et al. |
| 2019/0337416 A1 | 11/2019 | Condamin et al. |
| 2019/0337417 A1 | 11/2019 | Condamin et al. |
| 2019/0337418 A1 | 11/2019 | Condamin et al. |
| 2019/0337419 A1 | 11/2019 | Condamin et al. |
| 2019/0337420 A1 | 11/2019 | Condamin et al. |
| 2019/0337421 A1 | 11/2019 | Condamin et al. |
| 2019/0337422 A1 | 11/2019 | Condamin et al. |
| 2019/0337471 A1 | 11/2019 | Brehm |
| 2019/0379187 A1 | 12/2019 | Christensen et al. |
| 2019/0389336 A1 | 12/2019 | Malinowski et al. |
| 2020/0009995 A1 | 1/2020 | Sonar |
| 2020/0055423 A1 | 2/2020 | Prozzi et al. |
| 2020/0079244 A1 | 3/2020 | Carbone et al. |
| 2020/0180516 A1 | 6/2020 | Moulin |
| 2020/0180517 A1 | 6/2020 | Moulin |
| 2020/0189504 A1 | 6/2020 | Ricart et al. |
| 2020/0189511 A1 | 6/2020 | Ricart et al. |
| 2020/0194936 A1 | 6/2020 | Ricart et al. |
| 2020/0207241 A1 | 7/2020 | Moulin et al. |
| 2020/0262367 A1 | 8/2020 | Fernandez et al. |
| 2020/0269754 A1 | 8/2020 | Ricart et al. |
| 2020/0282871 A1 | 9/2020 | Ricart et al. |
| 2020/0282880 A1 | 9/2020 | Jones et al. |

FOREIGN PATENT DOCUMENTS

| | | |
|---|---|---|
| DE | 3710476 A1 | 10/1987 |
| DE | 29712180 U1 | 9/1997 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 A2 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

* cited by examiner

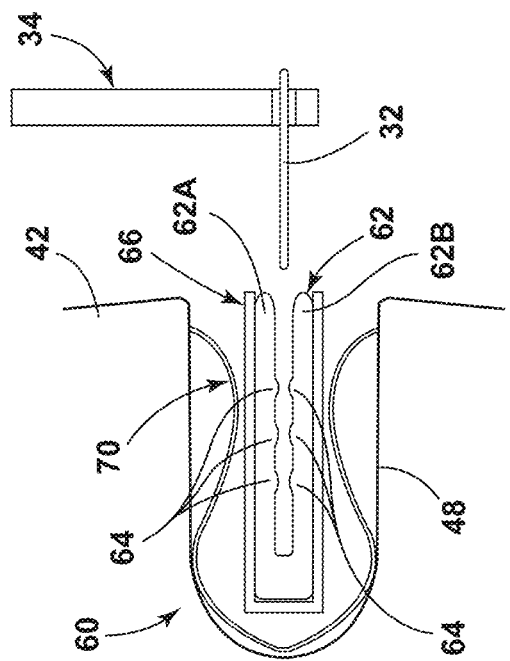
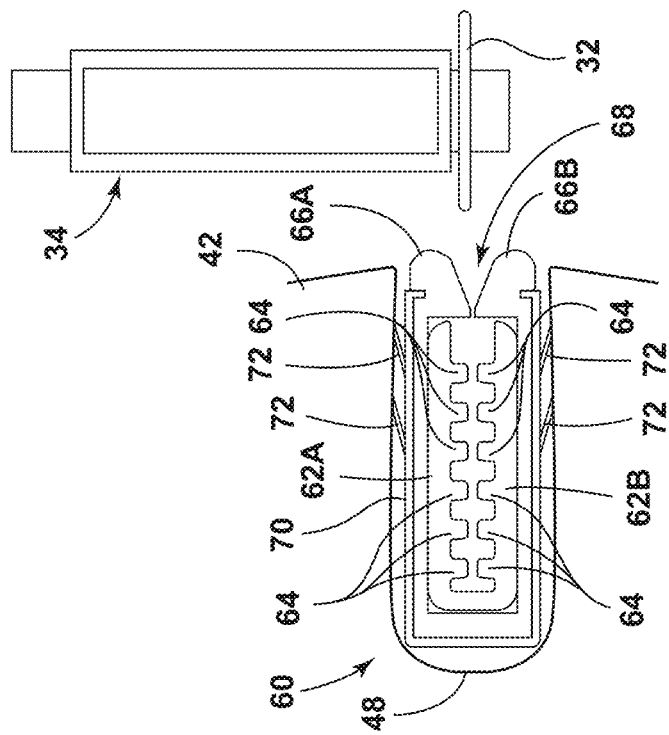

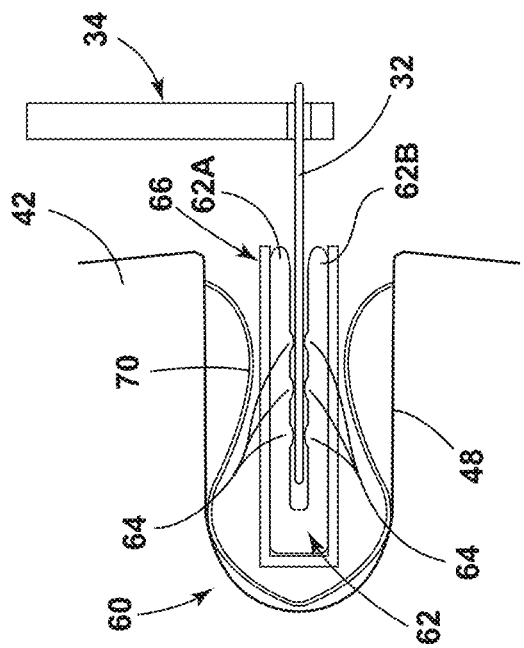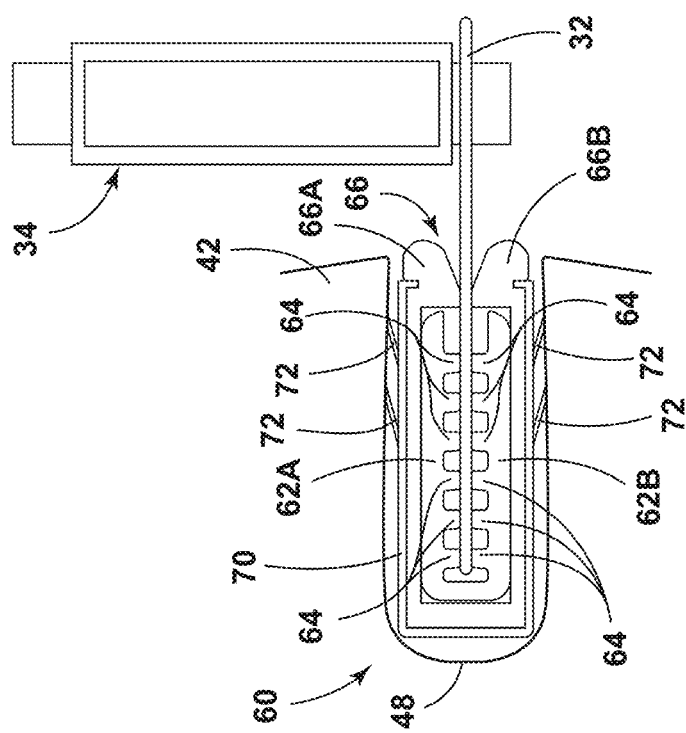
FIG. 4A
FIG. 4B

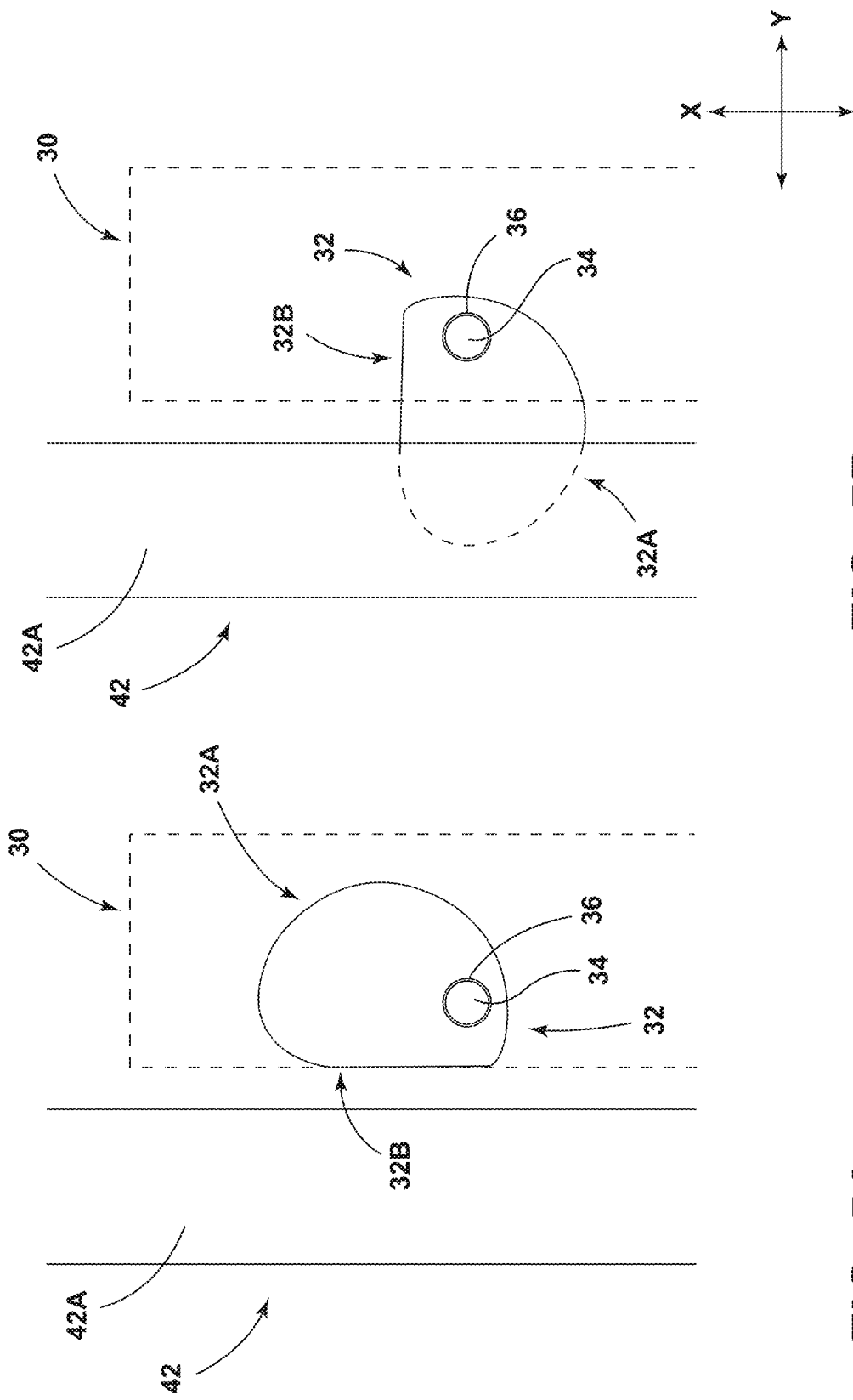

SUPPORT ASSEMBLY WITH A SUPPORT MEMBER AND A TRACK ASSEMBLY

TECHNICAL FIELD

The present disclosure generally relates to a support assembly, including support assemblies that may be used in connection with vehicles.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some support assemblies may be relatively complex and/or may not provide sufficient functionality. Some support assemblies may not be configured to selectively connect a support assembly with a conductor disposed in the track.

There is a desire for solutions/options that minimize or eliminate one or more challenges or shortcomings of support assemblies. The foregoing discussion is intended only to illustrate examples of the present field and should not be taken as a disavowal of scope.

SUMMARY

In embodiments, a support assembly may include a support member and/or a track assembly. The support member may include a conductor and/or a pin. The track assembly may include a bus bar. The conductor may be configured to rotate with the pin to selectively engage the bus bar. The conductor may be configured to rotate about a vertical axis to selectively engage the bus bar. The conductor may be substantially curved and/or substantially planar. The conductor may include a first position and/or a second position. The conductor may not be in electrical contact with the bus bar when in the first position and/or the conductor may be in electrical contact with the bus bar when in the second position. When the conductor is in the first position, the conductor may not substantially restrict removal of the support member from the track assembly. When the conductor is in the second position, the conductor may restrict removal of the support member from the track assembly.

With embodiments, the conductor may be configured to rotate in a first direction when moving from the first position to the second position. The conductor may be configured to rotate in a second direction when moving from the second position to the first position, and/or the first direction may be opposite the second direction. The conductor may be substantially elongated and/or oblong. The track assembly may include a first track and/or a second track. The second track may be disposed substantially within the first track, and/or the bus bar may be disposed at least partially in the first track. The first track may include a recess, and/or the recess may be configured to at least partially receive the bus bar. The recess may be disposed in a lateral side of the first track.

In embodiments, the track assembly may include a connecting member, and/or the connecting member may be configured to connect the bus bar to the first track. The connecting member may be configured to be press-fit and/or interference fit into the recess. The track assembly may include a second bus bar, and/or the connecting member may be configured to secure the bus bar and the second bus bar in the recess. The support member may include a second conductor. The conductor and/or the second conductor may be configured to rotate with the pin. The second conductor may be configured to selectively engage the second bus bar. The track assembly may include a connecting member and/or an insulator. The insulator may be disposed at least partially in the connecting member, and/or the bus bar may be disposed at least partially in the insulator. The insulator may electrically insulate the bus bar from the connecting member and/or the first track. The conductor may include a rounded portion and/or a linear portion.

With embodiments, the support assembly may include one or more additional conductors. The track assembly may include an additional bus bar for each of the one or more additional conductors. In a first position of the conductor, the conductor may extend substantially in an X-direction. In a second position of the conductor, the conductor may extend substantially in a Y-direction and/or may be disposed in contact with opposing portions of the bus bar.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

FIGS. 2A and 2B are cross-sectional views generally illustrating portions of embodiments of support assemblies according to teachings of the present disclosure.

FIGS. 4A and 4B are cross-sectional views generally illustrating embodiments of support assemblies with conductors in connected positions according to teachings of the present disclosure.

FIG. 5A is a top cross-sectional view generally illustrating an embodiment of a support assembly with a conductor in a first/disconnected position according to teachings of the present disclosure.

FIG. 5B is a cross-sectional view generally illustrating an embodiment of a support assembly with a conductor in second/connected position according to teachings of the present disclosure.

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they are not intended to limit the present disclosure to these embodiments and/or examples. On the contrary, the present disclosure is intended to cover alternatives, modifications, and equivalents.

Figure 1:
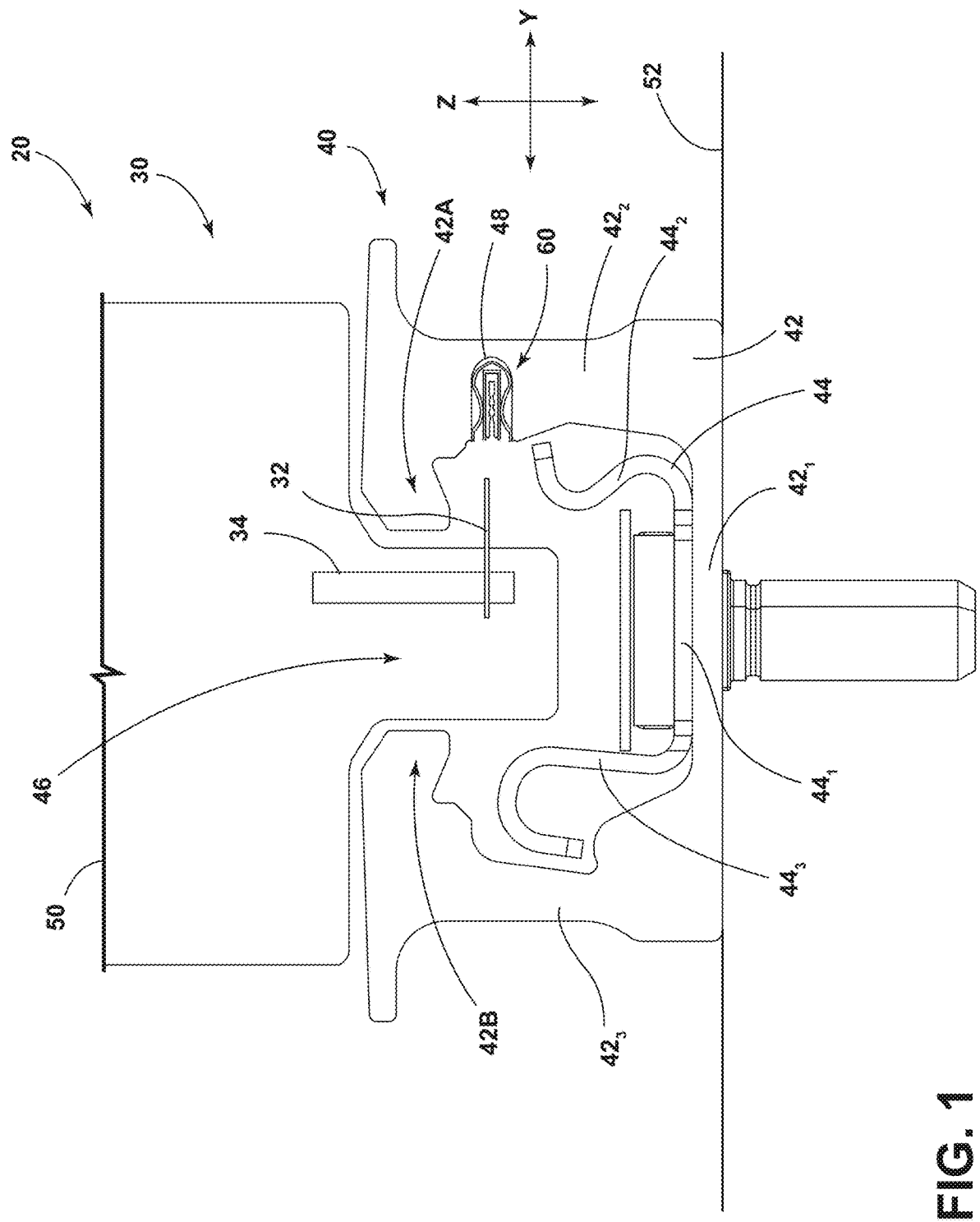
FIG. 1 is a cross-sectional view generally illustrating an embodiment of a support assembly according to teachings of the present disclosure.
Figure 3B:
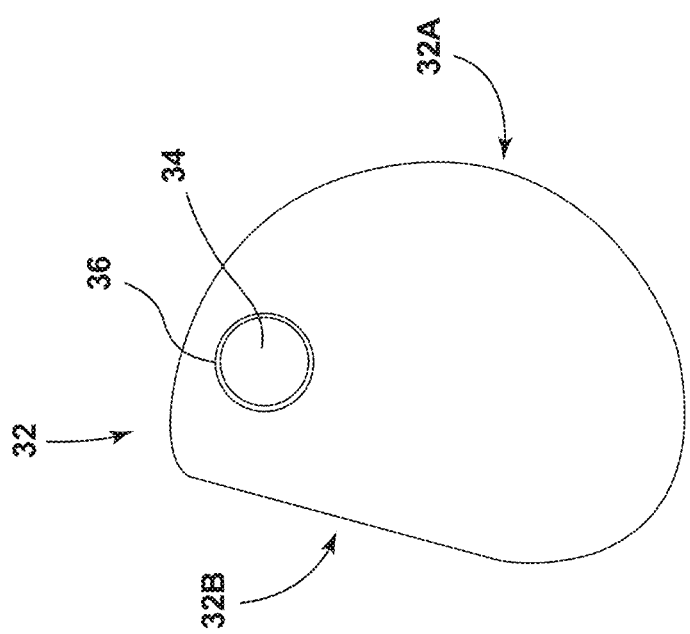
FIGS. 3A and 3B are top views generally illustrating embodiments of conductors in disconnected positions according to teachings of the present disclosure.
Figure 3A:
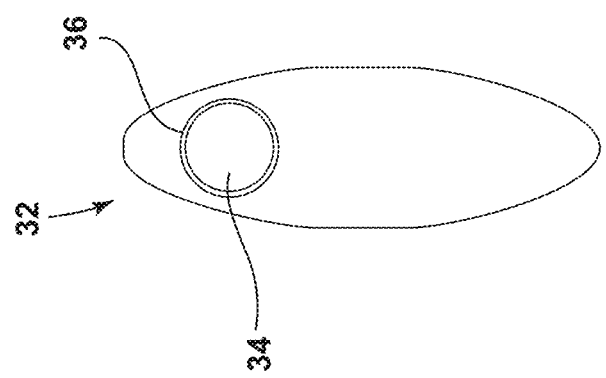

In embodiments, such as generally illustrated in FIG. 1, a support assembly 20 may include a support member 30 and/or a track assembly 40. The support assembly 20 may be connected to one or more of a variety of locations or components. For example and without limitation, a support member 30 may be connected a vehicle seat 50, and/or a track assembly 40 may be connected to a mounting surface 52, such as a vehicle floor.

With embodiments, a support member 30 may be selectively connected to (e.g., engaged with) a track assembly 40. The support member 30 and/or the track assembly 40 may extend substantially longitudinally (e.g., in an X-direction). For example and without limitation, the support member 30 may move (e.g., slide, roll, translate, etc.) in a longitudinal direction along the track assembly 40. The support member 30 may selectively engage and/or disengage from the track assembly 40. The support member 30 may include a cassette configuration.

In embodiments, such as generally illustrated in FIG. 1, a track assembly 40 may include a first track 42 (e.g., an outer track) and/or a second track 44 (e.g., an inner track). The first track 42 and/or the second track 44 may extend in a longitudinal direction (e.g., the X-direction). The first track 42 may include a first wall $42_1$ (e.g., a bottom wall), a second wall $42_2$ (e.g., a side wall), and/or a third wall $42_3$ (e.g., a side wall). The bottom wall $42_1$, the second wall $42_2$, and/or the third wall $42_3$ may be connected to form a generally U-shaped configuration. The bottom wall $42_1$ may, for example, be substantially planar. The second wall $42_2$ and/or the third wall $42_3$ may extend perpendicularly (e.g., vertically) from the bottom wall $42_1$. The second wall $42_2$ may include a first portion 42A, and/or the third wall $42_3$ may include a second portion 42B. The first portion 42A and/or the second portion 42B may project laterally inward toward a center of the track assembly 40 (e.g., in a Y-direction). The first portion 42A and/or the second portion 42B may be substantially planar. In embodiments, the first portion 42A and the second portion 42B may be disposed such that a gap 46 is provided between the first portion 42A and the second portion 42B (e.g., the first portion 42A and the second portion 42B may be offset in the Y-direction). The gap 46 may extend longitudinally along the track assembly 40, and/or the gap 46 may be centered along the track assembly 40.

The second track 44 may be disposed at least partially in the first track 42. The second track 44 may be substantially U-shaped. The second track 44 may include a first wall $44_1$, a second wall $44_2$, and/or a third wall $44_3$. The second wall $44_2$ may be shorter (e.g., vertical or in the Z-direction) than the third wall $44_3$. The second wall $44_2$ and/or the third wall $44_3$ may be partially bent and/or curved. The second wall $44_2$ and the third wall $44_3$ may extend perpendicularly (e.g., vertically) from opposite sides of the first wall $44_1$. The first wall $44_1$ of the second track 44 may be generally aligned with and/or adjacent to the first wall $42_1$ of the first track 42. The second wall $44_2$ of the second track 44 may be generally aligned with and/or adjacent to the second wall $42_2$ of the first track 42. The third wall $44_3$ of the second track 44 may be generally aligned with and/or adjacent to the third wall $42_3$ of the first track 42.

With embodiments, the first track 42 may include a recess 48. The recess 48 may be disposed between a top of the second wall $42_2$ of the first track 42 and a top of the second wall $44_2$ of the second track 44. The recess 48 may extend partially into the second wall $42_2$ (e.g., in the Y-direction). The recess 48 may include one or more of a variety of shapes, sizes, and/or configurations. For example and without limitation, the recess 48 may be substantially rectangular, circular, and/or curved.

In embodiments, such as generally illustrated in FIGS. 2A and 2B, the track assembly 40 may include a bus bar assembly 60. The bus bar assembly 60 may include a bus bar 62, an insulator 66, and/or a connecting member 70. The bus bar 62 may include one or more of a variety of shapes, sizes, and/or configurations. For example and without limitation, the bus bar 62 may be substantially U-shaped. The bus bar 62 may extend substantially longitudinally (e.g., in the X-direction). The bus bar 62 may be electrically conductive and/or include an electrically conductive material. The bus bar 62 may be disposed at least partially in the recess 48 of the first track 42. The bus bar 62 may be disposed at least partially between the first track 42 and the second track 44 (e.g., in the Z-direction). The bus bar 62 may extend along part of or along the entire length of the first track 42. The bus bar 62 may be configured to provide an electrical connection to a support member 30 at any and/or all points along the track assembly 40.

With embodiments, the bus bar 62 may include a first portion 62A and a second portion 62B, and the first portion 62A may be disposed substantially opposite the second portion 62B. The first portion 62A and/or the second portion 62B may include one or more protrusions 64 disposed on an inner surface of the bus bar 62. The first portion 62A and the second portion 62B may include an equal number of protrusions 64, and/or the protrusions 64 may be disposed across/opposite from one another (e.g., aligned in the Z-direction).

In embodiments, the bus bar assembly 60 may include an insulator 66. The insulator 66 may be disposed at or on an outer surface of the bus bar 62. The insulator 66 may limit and/or prevent electrical contact/connection between the bus bar 62, the connecting member 70, and/or the first track 42. The insulator 66 may include a similar shape as the bus bar 62 (e.g., may be generally U-shaped). The insulator 66 may include an aperture or recess 68 that may be configured to facilitate electrical connection between the bus bar 62 and a conductor 32 of the support member 30. The insulator 66 may include a first insertion portion 66A and/or a second insertion portion 66B that may be configured to facilitate insertion of a conductor 32. The first insertion portion 66A and/or the second insertion portion 66B may be tapered (e.g., disposed at an acute angle with respect to the Y-direction and/or the Z-direction). A conductor 32 may be configured to contact an end of the insertion portions 66A, 66B, and the insertion portions 66A, 66B may guide the conductor 32 towards a middle of the bus bar 62 (e.g., between the first portion 62A and the second portion 62B). The insertion portions 66A, 66B may facilitate in connection between a conductor 32 and the bus bar 62 (e.g., the insertion portions 66A, 66B may compensate for at least some degree of misalignment).

In embodiments, the track assembly 40 may include a connecting member 70. The connecting member 70 may include one or more of a variety of shapes, sizes, and/or configurations. For example and without limitation, the connecting member 70 may be substantially rectangular, curved, and/or U-shaped. The connecting member 70 may be a spring-type element. The connecting member 70 may receive at least a portion of the bus bar 62 and/or the insulator 66. With embodiments, the connecting member 70 may receive substantially the entire bus bar 62 and/or the entire insulator 66. The connecting member 70 may be at least partially inserted into the recess 48, and/or the connecting member 70 may limit movement of the bus bar 62 and/or the insulator 66 in at least one direction (e.g., lateral/Y-direction movement and/or X-direction movement of the bus bar 62/insulator 66 out of the track assembly 40). The connecting member 70 may be press-fit or interference fit into the recess 48. The connecting member 70 may bend and/or flex when inserted into the recess 48 of the first track 42. The spring force of the connecting member 70 between the inner surface of the recess 48 and the outer surface of the insulator 66 may secure the bus bar 62 and the insulator 66 within the first track 42. Additionally or alternatively, the spring force may facilitate an electrical connection between the first portion 62A and the second portion 62B of the bus bar 62 with the conductor 32 (e.g., the connecting member 70 may provide a clamping force for the bus bar 62 on the conductor 32).

With embodiments, the connecting member 70 may include one or more securing protrusions 72. The securing protrusions 72 may include one or more of a variety of shapes, sizes, and/or configurations. For example and without limitation, the securing protrusions 72 may be substantially planar and/or may extend from an outer surface of the connecting member 70. The securing protrusions 72 may extend from the outer surface of the connecting member 70 at an angle (e.g., an oblique angle) with respect to the Y-direction. The securing protrusions 72 may limit movement of the connecting member 70 relative to the first track 42 in at least one direction (e.g., the Y-direction). The securing protrusions 72 may limit movement of the bus bar 62 from the second wall 42$_2$ toward the center of the first track 42.

In embodiments, the support member 30 may be configured to selectively engage the track assembly 40, such as the first track 42 and/or the second track 44 (e.g., see, FIG. 1). The support member 30 may be vertically inserted (e.g., in the Z-direction) and/or vertically removed (e.g., in the Z-direction) from engagement with the track assembly 40. The support member 30 may be configured to be disposed at least partially within the gap 46 of the first track 42, such that the support member 30 may selectively engage the track assembly 40. The support member 30 may be configured to move (e.g., in the X-direction) along the track assembly 40.

With embodiments, such as generally illustrated in FIGS. 1, 2A, 2B, 3A, and 3B, the support member 30 may include a conductor 32 and/or a pin/shaft 34. The conductor 32 may be connected to the shaft 34. The conductor 32 may include one or more of a variety of shapes, sizes, and/or configurations. For example and without limitation, the conductor 32 may be oval-shaped, rectangular, curved, rounded, and/or oblong. The conductor 32 may be planar. The conductor 32 may include a rounded portion 32A and/or a linear portion 32B (e.g., the conductor 32 may include a generally semicircular configuration). The conductor 32 may be configured to rotate such that the rounded portion 32A engages the bus bar 62 before the linear portion 32B. The conductor 32 may be configured to selectively electrically connect to the bus bar 62. The conductor 32 may provide an electrical connection between the bus bar 62 and the support member 30 and/or a seat 50 connected thereto (e.g., the support assembly 20/seat 50 may include various electrical components that may connect to and/or draw power from the bus bar 62).

In embodiments, such as generally illustrated in FIGS. 2A, 2B, 4A, and 4B, the conductor 32 may be configured to selectively rotate into engagement with the bus bar 62. The conductor 32 may be connected to the support member 30 via the pin 34. The pin 34 may extend substantially in the Z-direction from the support member 30. The pin 34 may be configured to extend into a gap 46 of the first track 42 and/or may generally extend into the track assembly 40 (see, e.g., FIG. 1). The pin 34 may selectively extend and/or retract in the Z-direction from the support member 30. The pin 34 may be connected to the conductor 32 via an aperture 36 of the conductor 32. The aperture 36 that may be disposed at or about an end of the conductor 32. The aperture 36 may be substantially circular and/or oval-shaped. The aperture 36 may receive at least a portion of the pin 34. The pin 34 may be connected to the conductor 32 such that the conductor 32 may rotate with the pin 34. The support member 30 may selectively rotate the pin 34 which may rotate the conductor 32 between engagement and/or disengagement with the bus bar 62 and/or the track assembly 40. The support member 30 may rotate the pin 34 and/or the conductor 32 such that the support member 30 may be inserted into and/or removed from the track assembly 40 (e.g., in the Z-direction).

With embodiments, the conductor 32 may include a first position and/or a second position. When the conductor 32 is in the first position (e.g., a retracted or disconnected position), the support member 30 may move (e.g., in the Z-direction) in and/or out of the track assembly 40 (see, e.g., FIGS. 2A, 2B, and 5A). In the first position, the conductor 32 may not be electrically and/or mechanically connected with the bus bar 62 and/or the conductor 32 may extend substantially in an X-direction. For example and without limitation, in the first position, no portion of the conductor 32 may be disposed within or in contact with the bus bar 62. When the support member 30 is centered (e.g., in the Y-direction) with respect to the track assembly 40 and the conductor 32 is in the first position, the conductor 32 may not overlap (e.g., in the Z-direction) with the first portion 42A and/or the second portion 42B of the first track 42 such that the conductor 32 does not restrict relative movement (e.g., Z-direction movement) between the support member 30 and the track assembly 40. In the first position, the conductor 32 may not be connected to the bus bar 62 such that the bus bar 62 may not be electrically connected with or provide power to electrical components that may be connected to the support member 30 and/or the seat 50.

With embodiments, the conductor 32 may move from the first position to the second position. When moving from the first position to the second position, the support member 30 may rotate the pin 34 which may result in rotation of the conductor 32 in a first direction. The conductor 32 may rotate from the first position in which the conductor 32 may be aligned with the gap 46 of the first track 42, to the second position in which the conductor 32 may overlap (e.g., in the Z-direction) with the first portion 42A and/or second portion 42B of the first track 42. When rotating from the first position to the second position, the conductor 32 may first contact the insulator 66 (e.g., the insertion portions 66A, 66B) and may then contact the bus bar 62, such as if the conductor 32 is not completely aligned with the bus bar 62 and/or if the insertion portions 66A, 66B are disposed in contact or nearly in contact with each other. If the conductor 32 is completely aligned (e.g., in the Z-direction) with the bus bar 62, the conductor 32 may not contact the insulator 66.

In embodiments, such as generally illustrated in FIGS. 4A, 4B, and 5B, the conductor 32 may include a second position. When the conductor 32 is in the second position, the support member 30 may not move (e.g., in the Z-direction) into and/or out of the track assembly 40. The conductor 32 may be vertically aligned/overlapping (e.g., in the Z-direction) with the first portion 42A of the first track 42 such that the support member 30 may not move in the Z-direction. In the second position, the conductor 32 may be in contact with the bus bar 62, such as while the support assembly 20 moves in the X-direction along the track. In the second position, a portion of the conductor 32 may be in contact with the insulator 66. The conductor 32 may extend substantially in the Y-direction when in the second position and/or may be disposed in contact with opposing portions 62A, 62B of the bus bar 62.

With embodiments, the conductor 32 may move from the second position to the first position. When moving from the second position to the first position, the support member 30 may rotate the pin 34, which may result in rotation of the conductor 32 in a second direction. The first direction may be opposite the second direction. The conductor 32 may rotate from the second position in which the conductor 32 may be aligned (e.g., in the Z-direction) with the bus bar 62, the first portion 62A, and/or the second portion 62B, to the first position in which the conductor 32 may be aligned (e.g., in the Z-direction) with the gap 46 of the first track 42.

Figure 6:
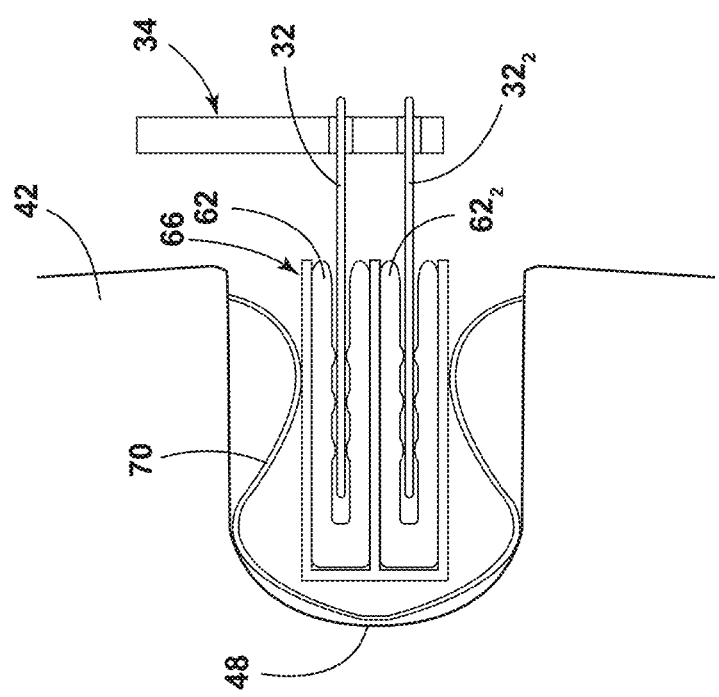
FIG. 6 is a cross-sectional view generally illustrating portions of an embodiment of a support assembly with conductors in connected positions according to teachings of the present disclosure.

In embodiments, such as generally illustrated in FIG. 6, the support assembly 20 may include a conductor 32 and/or one or more additional conductors (e.g., a second conductor $32_2$). The bus bar assembly 60 may include the first bus bar 62, the first insulator 66, and an additional bus bar for each additional conductor (e.g., a second bus bar $62_2$). The bus bar 62 and/or the second bus bar $62_2$ may be disposed at least partially within the recess 48 of the first track 42. The bus bar 62 may be at least partially aligned (e.g., in the Z-direction) with the second bus bar $62_2$. The bus bar 62 and/or the second bus bar $62_2$ may be disposed at least partially within the connecting member 70 (e.g., the same connecting member 70). With embodiments, the conductor 32 and/or the second conductor $32_2$ may be connected to the pin 34 (e.g., the same pin 34). The conductor 32 and/or the second conductor $32_2$ may rotate with the pin 34 such as to selectively engage the bus bar 62 and/or the second bus bar $62_2$, respectively. The conductor 32 may selectively rotate into engagement and/or electrical contact with the first bus bar 62, and/or the second conductor $32_2$ may selectively rotate into engagement and/or electrical contact with the second bus bar $62_2$. The first bus bar 62 and the second bus bar $62_2$ may be connected to different components/locations. For example and without limitation, the first bus bar 62 may be connected to a power supply and configured to provide power to the support member 30/the seat 50, and/or the second bus bar $62_2$ may be connected to a controller and configured to communicate data between the controller and the support member 30. The insulator 66 may electrically insulate the bus bar 62, the second bus bar $62_2$, and/or the first track 42 from each other. For example and without limitation, the insulator 66 may include a generally W-shaped configuration.

Figure 7A:
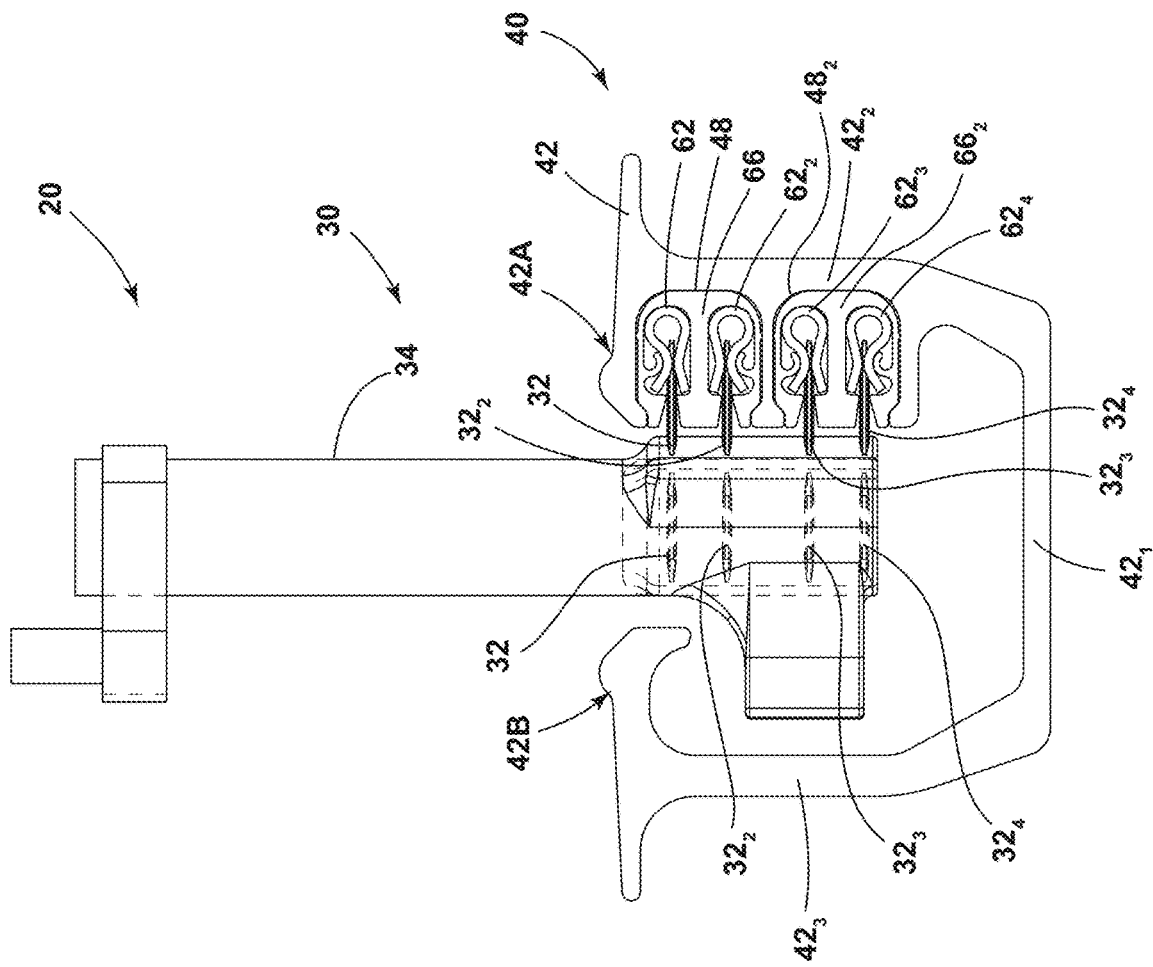
FIG. 7A is a cross-sectional view generally illustrating an embodiment of a support assembly according to teachings of the present disclosure.

In embodiments, such as generally illustrated in FIG. 7A, the support assembly 20 may include the bus bar 62, the second bus bar $62_2$, a third bus bar $62_3$, and/or a fourth bus bar $62_4$. The first track 42 may include the recess 48 and/or a second recess $48_2$. The first track 42 may include the insulator 66 and/or a second insulator $66_2$. The insulator 66 may be configured to receive at least a portion of the bus bar 62 and/or the second bus bar $62_2$. The second insulator $66_2$ may be configured to receive at least a portion of the third bus bar $62_3$ and/or the fourth bus bar $62_4$. The insulator 66 and/or the second insulator $66_2$ may include one or more of a variety of shapes, sizes, and/or configurations. The insulator 66 and/or the second insulator $66_2$ may include a shape such as to at least partially retain the bus bars 62, $62_2$, $62_3$, $62_4$ and/or limit movement of the bus bars 62, $62_2$, $62_3$, $62_4$ in the Y-direction (e.g., may include flanged ends). The insulator 66 and/or the second insulator $66_2$ may mechanically connect the bus bars 62, $62_2$, $62_3$, $62_4$ to the first track 42, and/or may electrically insulate the bus bars 62, $62_2$, $62_3$, $62_4$ from each other and/or the first track 42.

Figure 7B:
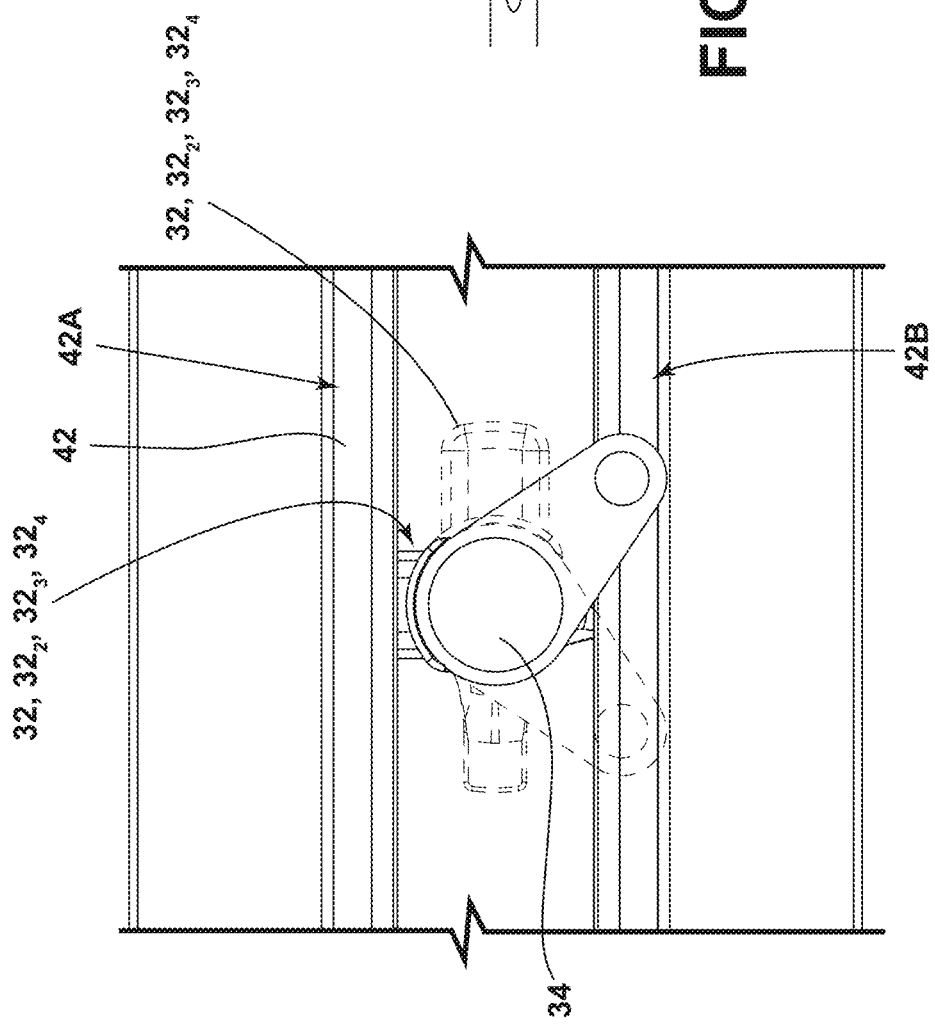
FIG. 7B is a top cross-sectional view generally illustrating an embodiment of a support assembly according to teachings of the present disclosure.
Figure 7C:
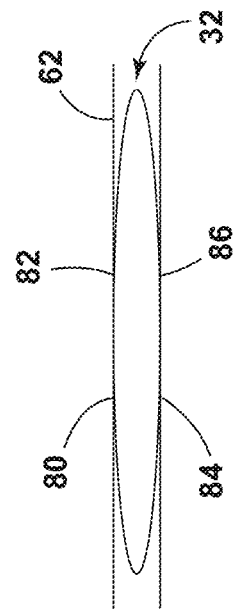
FIG. 7C is a cross-sectional view generally illustrating an embodiment of a conductor according to teachings of the present disclosure.

With embodiments, such as generally shown in FIG. 7A, the support assembly 20 may include the conductor 32, the second conductor $32_2$, a third conductor $32_3$, and/or a fourth conductor $32_4$. The conductor 32 may selectively engage the bus bar 62, the second conductor $32_2$ may selectively engage the second bus bar $62_2$, the third conductor $32_3$ may selectively engage the third bus bar $62_3$, and/or the fourth conductor $32_4$ may selectively engage the fourth bus bar $62_4$ (see, e.g., FIG. 7B). The conductors 32, $32_2$, $32_3$, $32_4$ may be configured to rotate with and/or about the axis of the pin 34 that may extend in the Z-direction from the support member 30. The conductors 32, $32_2$, $32_3$, $32_4$ may rotate with each other (e.g., may rotate at the same time in the same direction). The conductors $32_2$, $32_3$, $32_4$ may include one or more of a variety of shapes sizes and/or configurations, such as described above in connection with the conductor 32. Additionally or alternatively, the conductors 32, $32_2$, $32_3$, $32_4$ may be rounded such that each conductor 32, $32_2$, $32_3$, $32_4$ may include a first contact portion 80, a second contact portion 82, a third contact portion 84, and/or a fourth contact portion 86 (see, e.g., FIG. 7C). The first contact portion 80 and/or the second contact portion 82 may contact a top of the bus bar 62, and/or third contact portion 84 and/or the fourth contact portion 86 may contact a bottom of the bus bar 62. The contact portions 80, 82, 84, 86 may be in contact with the bus bar 62 as the support member 30 moves along the track assembly 40 in the X-direction.

Figure 8A:
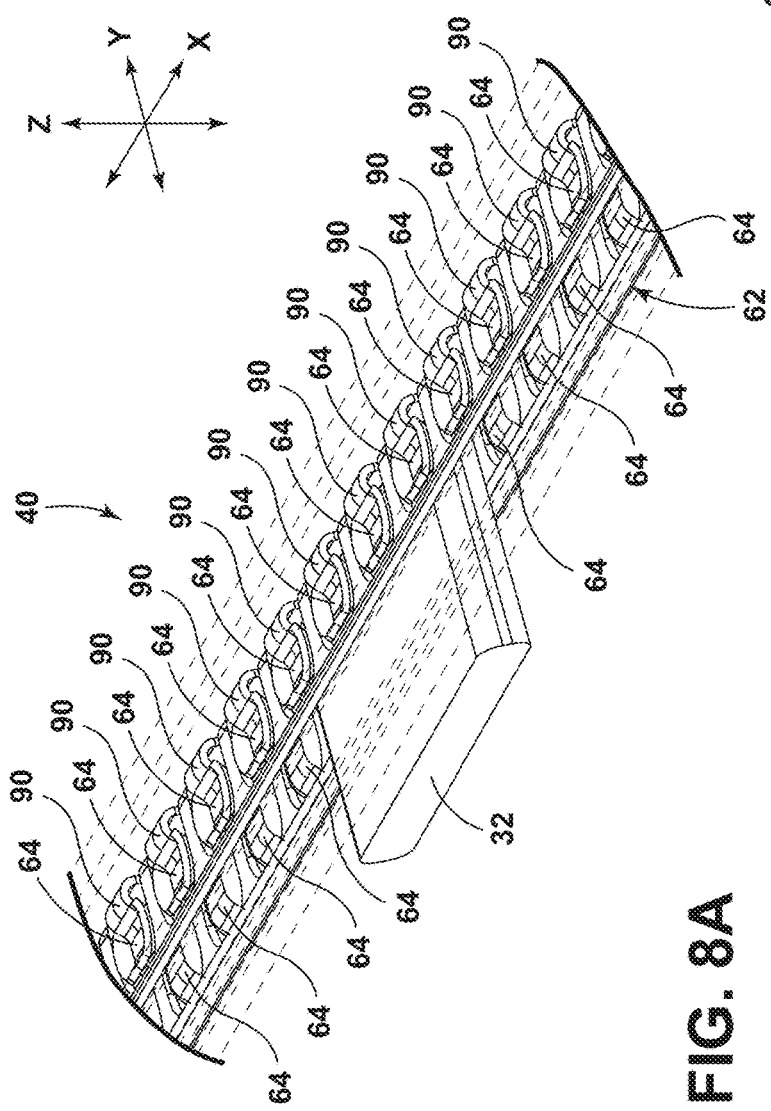
FIG. 8A is a perspective view generally illustrating portions of an embodiment of a support assembly according to teachings of the present disclosure.
Figure 8B:
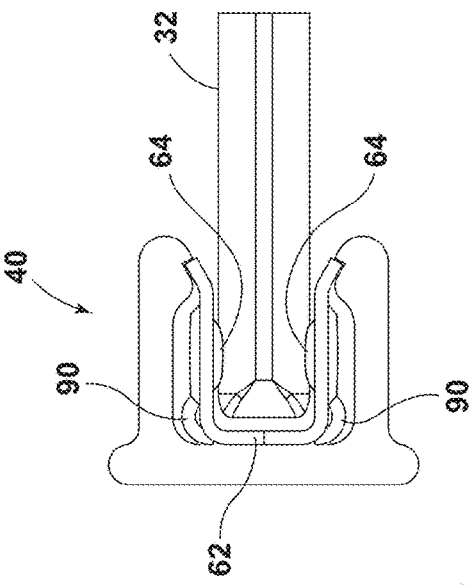
FIG. 8B is a cross-sectional view generally illustrating portions of a support assembly according to teachings of the present disclosure.

In embodiments, such as generally illustrated in FIGS. 8A and 8B, the bus bar 62 may include protrusions 64 that may be configured to flex upon insertion of the conductor 32 into engagement with the bus bar 62. The protrusions 64 may include one or more of a variety of shapes, sizes, and/or configurations. For example and without limitation, the protrusions 64 may be substantially rounded, semi-spherical, and/or bubble-shaped. The protrusions 64 may be disposed on the first portion 62A and/or the second portion 62B of the bus bar 62. The protrusions 64 may be disposed along the bus bar 62 in the X-direction (e.g., an array of protrusions 64 may extend in the X-direction). The protrusions 64 may be connected to the bus bar 62 via members 90. The members 90 may include one or more of a variety of shapes, sizes, and/or configurations. For example and without limitation, the members 90 may be substantially curved. The members 90 may move (e.g., bend, flex, etc.) as the conductor 32 may be inserted into the bus bar 62. The members 90 may bend away from the conductor 32 as the conductor 32 is inserted between the first portion 62A and the second portion 62B of the bus bar 62. The members 90 may bias the protrusions 64 into contact with the conductor 32.

Various embodiments are described herein for various apparatuses, systems, and/or methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments.

Reference throughout the specification to "various embodiments," "with embodiments," "in embodiments," or "an embodiment," or the like, means that a particular feature, structure, or characteristic described in connection with the embodiment is included in at least one embodiment. Thus, appearances of the phrases "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are intended to be inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

It is intended that all matter contained in the above description or shown in the accompanying drawings shall be interpreted as illustrative only and not limiting. Changes in detail or structure may be made without departing from the present disclosure.

What is claimed is:

1. A support assembly comprising:
   a support member including:
      a conductor; and
   a track assembly including:
      a bus bar,
      a first track;
      a connecting member, and
      an insulator disposed to electrically insulate the bus bar from the connecting member;
   wherein the conductor is configured to move to selectively engage the bus bar; and the connecting member includes a spring configuration.

2. The support assembly of claim 1, wherein the conductor is configured to rotate about a vertical axis to selectively engage the bus bar.

3. The support assembly of claim 1, including a vehicle seat connected to the support member.

4. The support assembly of claim 1, wherein the conductor is substantially semi-circular.

5. The support assembly of claim 1, wherein the conductor includes a first position and a second position; the conductor is not in electrical contact with the bus bar when in the first position; and the conductor is in electrical contact with the bus bar when in the second position.

6. The support assembly of claim 5, wherein when the conductor is in the first position, the conductor does not restrict removal of the support member from the track assembly; and when the conductor is in the second position, the conductor restricts removal of the support member from the track assembly.

7. The support assembly of claim 5, wherein the conductor is configured to rotate in a first direction when moving from the first position to the second position; the conductor is configured to rotate in a second direction when moving from the second position to the first position; and the first direction is opposite the second direction.

8. The support assembly of claim 1, wherein the track assembly includes a second track; the second track is disposed substantially within the first track; and the bus bar is disposed at least partially in the first track.

9. The support assembly of claim 8, wherein the first track includes a recess and the recess is configured to at least partially receive the bus bar.

10. The support assembly of claim 9, wherein the recess is disposed in a lateral side of the first track such that the recess is offset in a Y-direction from the second track.

11. The support assembly of claim 10, wherein the connecting member is configured to be press-fit and/or interference fit into the recess.

12. The support assembly of claim 10, including a second bus bar; wherein the connecting member is configured to secure the bus bar and the second bus bar in the recess.

13. The support assembly of claim 12, wherein the support member includes a second conductor; the conductor and the second conductor are configured to rotate with or about a pin; and the second conductor is configured to selectively engage the second bus bar.

14. A support assembly comprising:
   a support member including:
      a conductor; and
   a track assembly including:
      a bus bar,
      a first track;
      a connecting member, and
      an insulator disposed to electrically insulate the bus bar from the connecting member;

wherein the conductor is configured to move to selectively engage the bus bar; and the bus bar includes a plurality of flexible protrusions spaced in a longitudinal direction of the track assembly.

15. A support assembly comprising:
a support member including:
a conductor; and
a track assembly, including:
a bus bar,
a first track,
a second track disposed at least partially in the first track, and
a connecting member;
wherein the conductor is configured to to selectively engage the bus bar; the connecting member is configured to connect the bus bar to the first track; and the bus bar is disposed at least partially in the first track.

16. The support assembly of claim 15, wherein the connecting member includes a spring configuration.

17. The support assembly of claim 15, wherein the conductor includes a rounded portion and a linear portion disposed opposite the rounded portion.

18. The support assembly of claim 15, wherein the support assembly includes three or more additional conductors and the track assembly includes an additional bus bar for each of the three or more additional conductors.

19. The support assembly of claim 15, wherein in a first position of the conductor, the conductor extends substantially in an X-direction; and in a second position of the conductor, the conductor extends substantially in a Y-direction beyond the second track and is disposed in contact with opposing portions of the bus bar.

20. A support assembly comprising:
a support member, including:
a conductor, and
a pin; and
a track assembly, including:
a bus bar, a first track,
an insulator, and
a connecting member connecting the bus bar with the first track;
wherein the conductor is configured to rotate with and/or about the pin to selectively engage the bus bar; the insulator is disposed at least partially in the connecting member; the bus bar is disposed at least partially in the insulator; and the insulator electrically insulates the bus bar from the connecting member and the first track.

* * * * *